United States Patent [19]

Sweet

[11] Patent Number: 5,192,209
[45] Date of Patent: Mar. 9, 1993

[54] COLOR DEMONSTRATOR

[76] Inventor: John P. Sweet, 2273 New York Ave., Scotch Plains, N.J. 07076

[21] Appl. No.: 756,521

[22] Filed: Sep. 9, 1991

[51] Int. Cl.$^5$ .......................................... G09B 19/00
[52] U.S. Cl. ................................................ 434/98
[58] Field of Search .................. 434/81, 84, 87-90, 434/93, 96-98, 368-370, 428, 102-104, 365, 367; 206/44 R, 44 B, 45.11, 45.13, 45.15, 45.31, 45.33, 575, 81; 40/446, 447; 351/242, 239, 243

[56] References Cited

U.S. PATENT DOCUMENTS

| | | | |
|---|---|---|---|
| 4,457,718 | 7/1984 | Lerner | 434/98 |
| 4,976,620 | 12/1990 | Tacquard et al. | 434/81 |
| 4,992,050 | 2/1991 | Edwards | 434/81 X |

FOREIGN PATENT DOCUMENTS 115382  7/1942  Australia ............................. 434/102

Primary Examiner—Richard J. Apley
Assistant Examiner—Glenn E. Richman
Attorney, Agent, or Firm—Richard T. Laughlin

[57] ABSTRACT

A demonstrator for demonstrating color combinations of the colors of the background and the lettering of a design. This demonstrator includes a support board, a background sheet resting on the board and having a plurality of spaced identical but differently colored panels which have identical but differently colored panels which have identical transparent letterings, a transparent lettering sheet resting on and slidable relative to the transparent background sheet and having a plurality of spaced identical but differently colored letterings disposed thereon, and a mask overlay sheet resting on the transparent lettering sheet and having a printed mask portion with a plurality of spaced identically shaped clear openings.

8 Claims, 4 Drawing Sheets

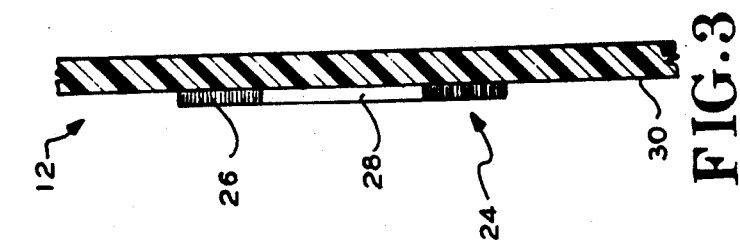
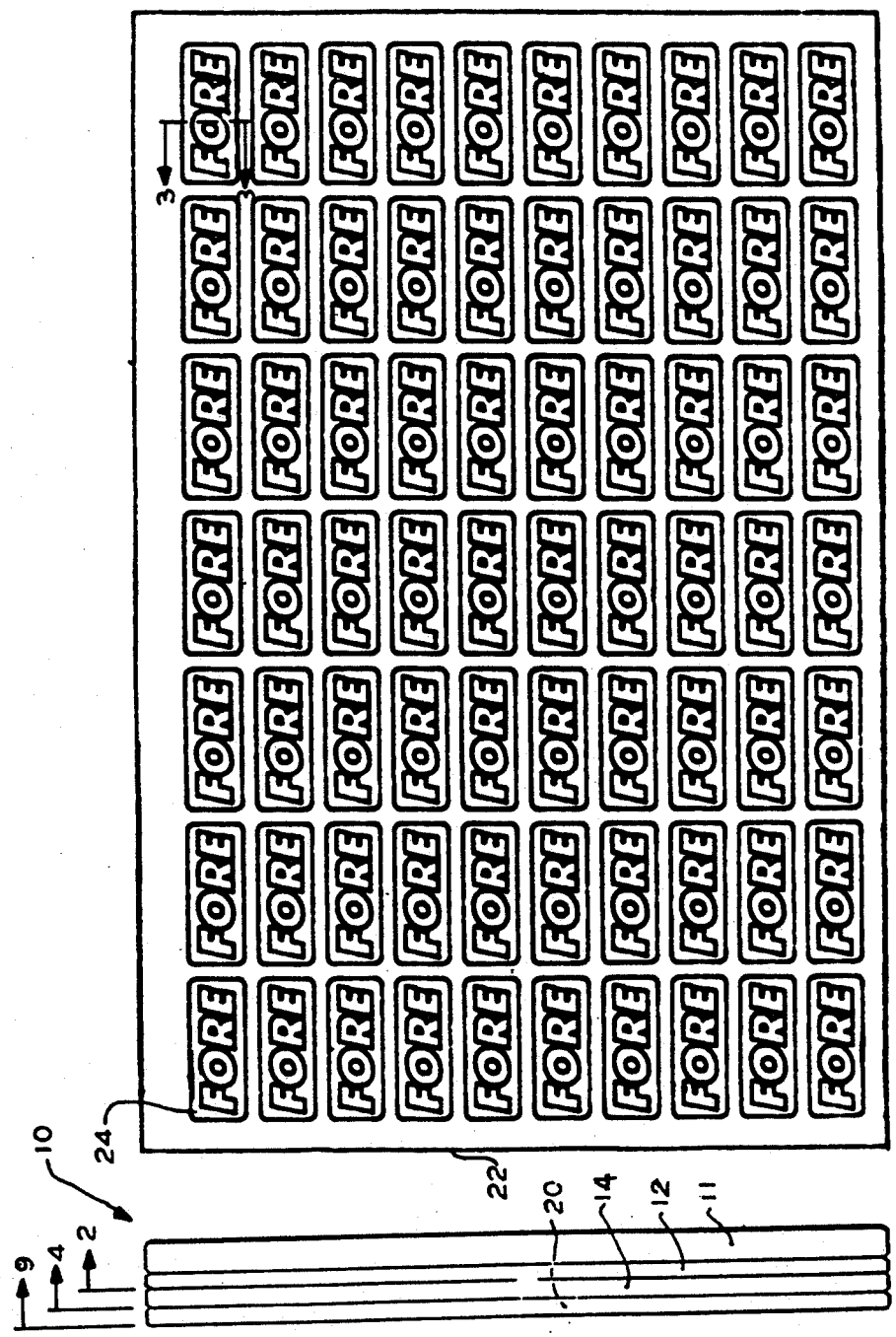

FIG. 4

COLOR DEMONSTRATOR

The invention relates to a color demonstrator, and in particular, the selection of color combinations utilizing a transparent background sheet with a plurality of identical but differently colored printed panels surrounding identical transparent letterings and having a superimposed transparent sheet with a plurality of identical but differently colored printed lettering for demonstrating color combinations of the background colors, lettering colors and letter outlines by relatively sliding the sheets.

BACKGROUND OF THE INVENTION

The prior art color demonstrator is described in U.S. Pat. No. 2,294,465, issued Sep. 1, 1942.
Related patents include U.S. Pat. Nos.
1,866,866, issued Jul. 12, 1932,
2,091,260, issued Aug. 31, 1937,
2,220,527, issued Nov. 5, 1940 and
Italian Patent Number 729,218 issued Dec. 1, 1966. A related publication, which describes a color demonstrator kit, is the magazine "Signs of the Times", May 1964, page 11.

The prior art color demonstrator includes a first transparent sheet having a picture painted on its inner face and includes a second transparent sheet having a second picture painted on its inner face, the sheets being fixedly connected along one edge so that the second picture can be superimposed on the first picture, for demonstrating an exterior view and a cutaway view of a product.

One problem with the prior art color demonstrator is that it is not useful for demonstrating color combinations of backgrounds and lettering.

SUMMARY OF THE INVENTION

According to the present invention, a color selection demonstrator is provided. This demonstrator comprises a transparent background sheet having a plurality of identical but differently colored printed background panels each of which surrounds identical transparent lettering and a transparent fill sheet resting on and slidable relative to the transparent background sheet and having a plurality of identical but differently colored printed letterings whereby different color combinations of a panel and a lettering can be demonstrated by sliding the fill sheet relative to the background sheet and by superimposing each printed lettering on the transparent lettering at a time.

By using the relatively slidable transparent sheets, different color combinations of the panel and the lettering can be demonstrated with ease, for designing colors of a background and lettering for printing or contrast demonstrator.

The foregoing and other objects, features and advantages will be apparent from the following description of the preferred embodiments of the invention as illustrated in the accompanying drawings.

BRIEF DESCRIPTION OF THE DRAWINGS

FIG. 1 is an end elevation view of a color demonstrator according to the present invention;

FIG. 2 is a section view as taken along the line 2—2 of FIG. 1;

FIG. 3 is a section view as taken along the line 3—3 of FIG. 2;

FIG. 4 is a section view as taken along the line 4—4 of FIG. 1;

DESCRIPTION OF THE PREFERRED EMBODIMENT

Figure 5:
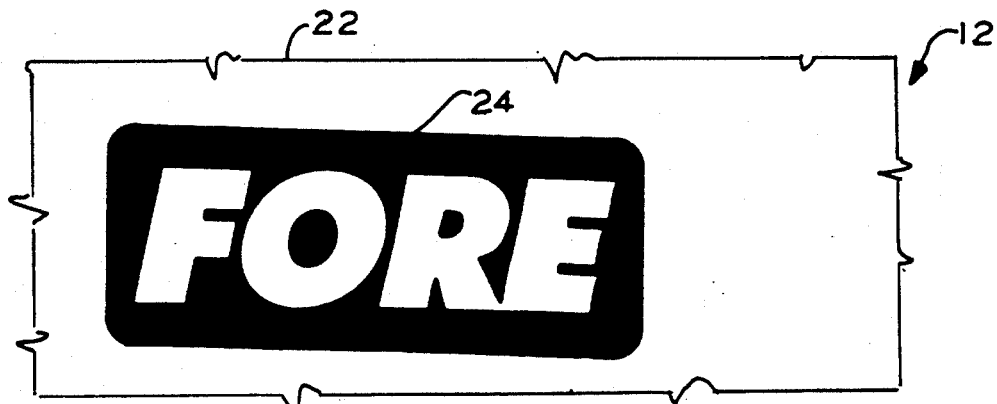
FIG. 5 is an enlarged view of a portion of FIG. 2.

As shown in FIG. 1, a demonstrator or assembly 10 is provided for use in demonstrating color combinations of a color background and lettering. Assembly 10 includes a support board 11, a background sheet or master sheet or background cut 12, a fill sheet 14 and a mask overlay sheet 20. In place of fill sheet 14, an outline sheet 16 and inset sheet 18 can be used together or separately. Sheets 12, 14, 16, 18, 20 each is slidable relative to the other sheets and relative to board 11. Support board 11 is made of an opaque or translucent white sheet of plastic material.

As shown in FIG. 2, background sheet 12 includes a transparent sheet 22 made of clear plastic material and a plurality of spaced identical differently colored panels 24. In this embodiment, there are 7 columns by 10 rows, or a total of 70 panels. Each panel 24 has a different color from the colors of the other 69 panels. Each panel 24 has a printed outer portion 26 and a clear inner portion 28 which forms a lettering. In this embodiment, the lettering 28 is the letters of the word "FORE". Outer printed portion 26 is printed on the clear plastic sheet 22, and surrounds lettering 26. Some of the panels 24 have a translucent color. Background sheet 12 has an upper surface or area 30 on which the printed portion 26 is joined or printed.

In this embodiment, sheet 22 has a thickness of about 5 millimeters, a length of about 24 inches and a width or height of about 16 inches. Sheet 22 is made of a clear polyester material.

Figure 4:
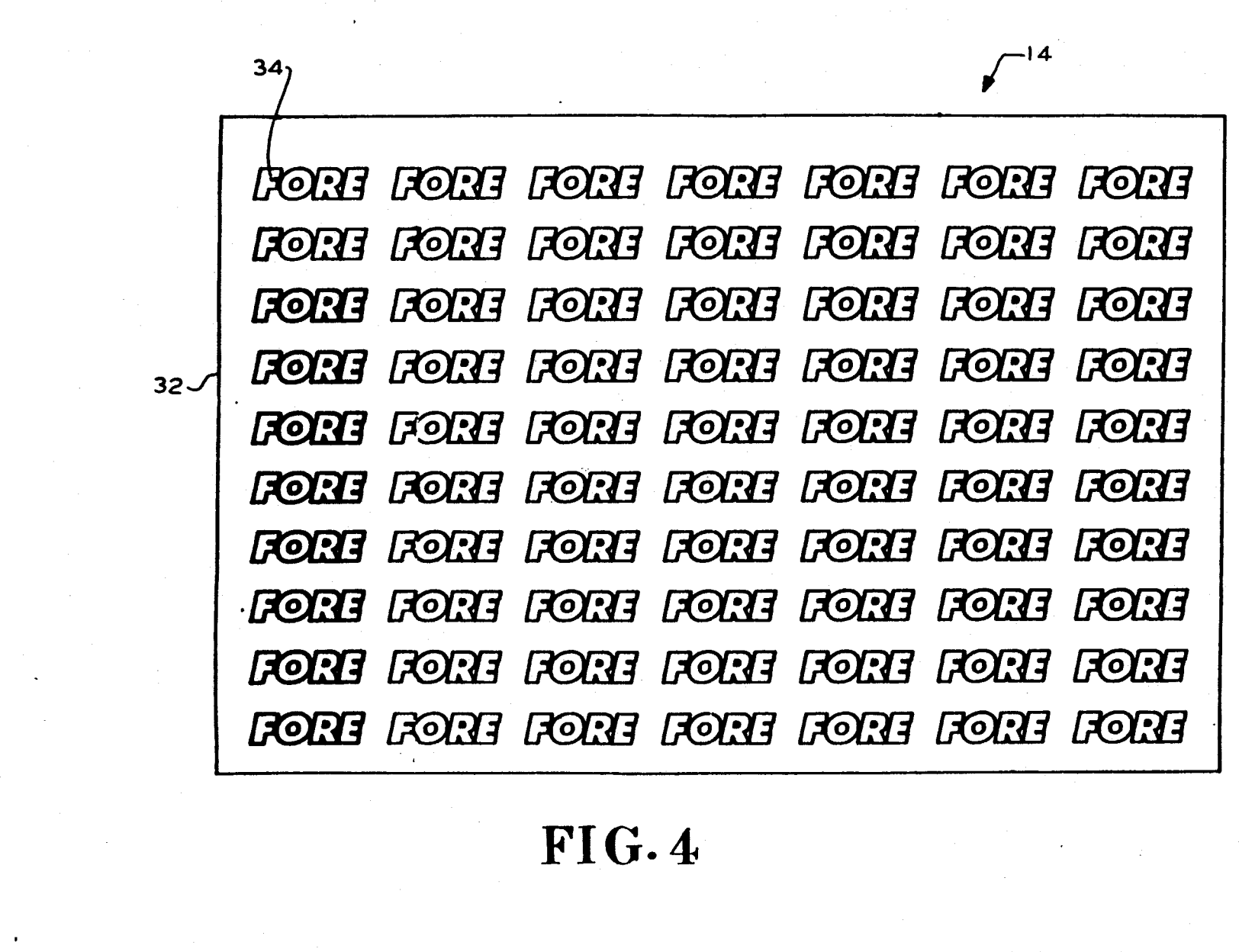

As shown in FIG. 4, sheet 14 includes a clear plastic sheet 32 and includes a plurality of spaced identical differently colored letterings 34 of the word "FORE". Letterings 34 are repeated seventy times in the embodiment. Each fill word lettering 34 is a color which is different from the colors of the other sixty-nine letterings. Letterings 34 are printed on clear plastic sheet 32 which is a clear polyester sheet.

Figure 6:
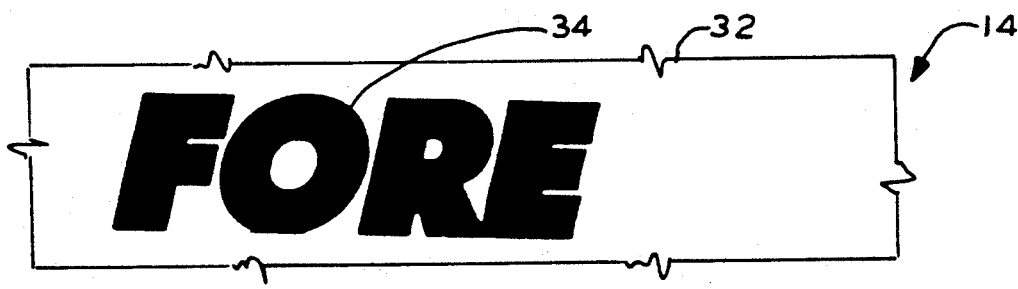
FIG. 6 is an enlarged view of a portion of FIG. 4.

FIG. 5 is an enlarged portion of FIG. 2 and shows the background sheet 12. FIG. 6 is an enlarged portion of FIG. 4, and shows the fill sheet 14. The letters on fill sheet 14 are slightly thicker than the clear letters on background sheet 12, so that the fill letters 34 can overlap the background letter 28 in order to prevent light seepage past fill letters 34 for backlighting of translucent colors.

Figure 7:
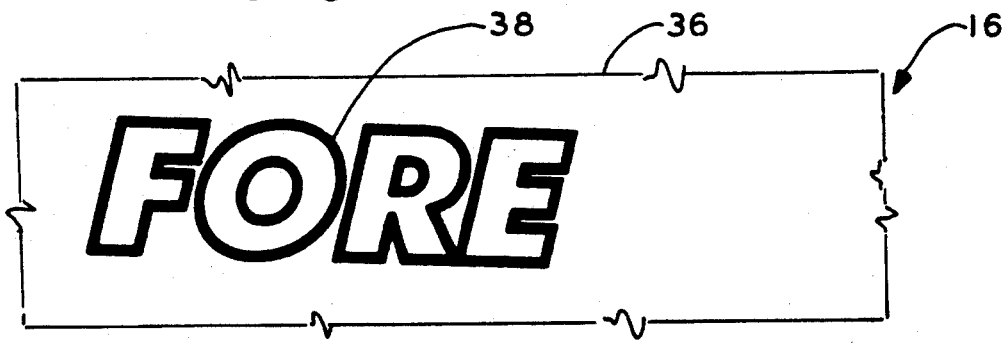
FIG. 7 is an enlarged view of a portion of an outline sheet.

As shown in FIG. 7, outline sheet 16 is similar to background sheet 12. Outline sheet 16 has a clear plastic sheet 36, and has a plurality of outline words or letterings 38 which are printed on clear plastic sheet 36.

Figure 8:
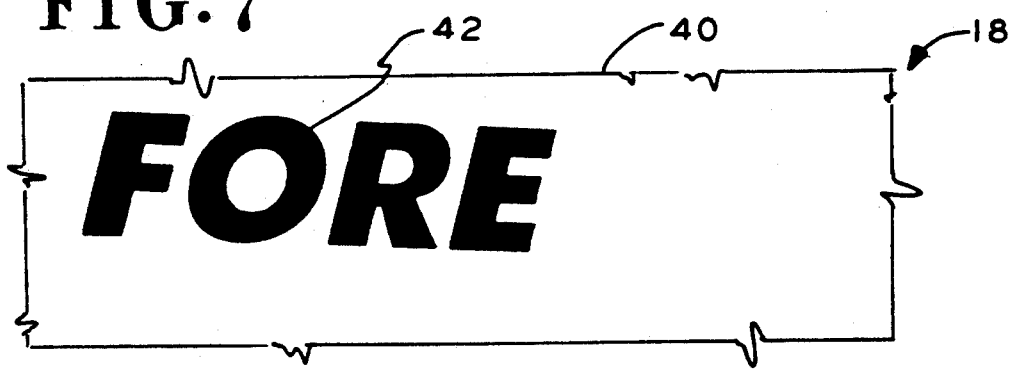
FIG. 8 is an enlarged view of a portion of an inset sheet.

As shown in FIG. 8, inset sheet 18 is similar to fill sheet 14. Inset sheet 18 includes a clear plastic sheet 40 and a plurality of insets are letterings 42 of the word "FORE". Letterings 42 are printed on clear plastic sheet 40.

Figure 9:
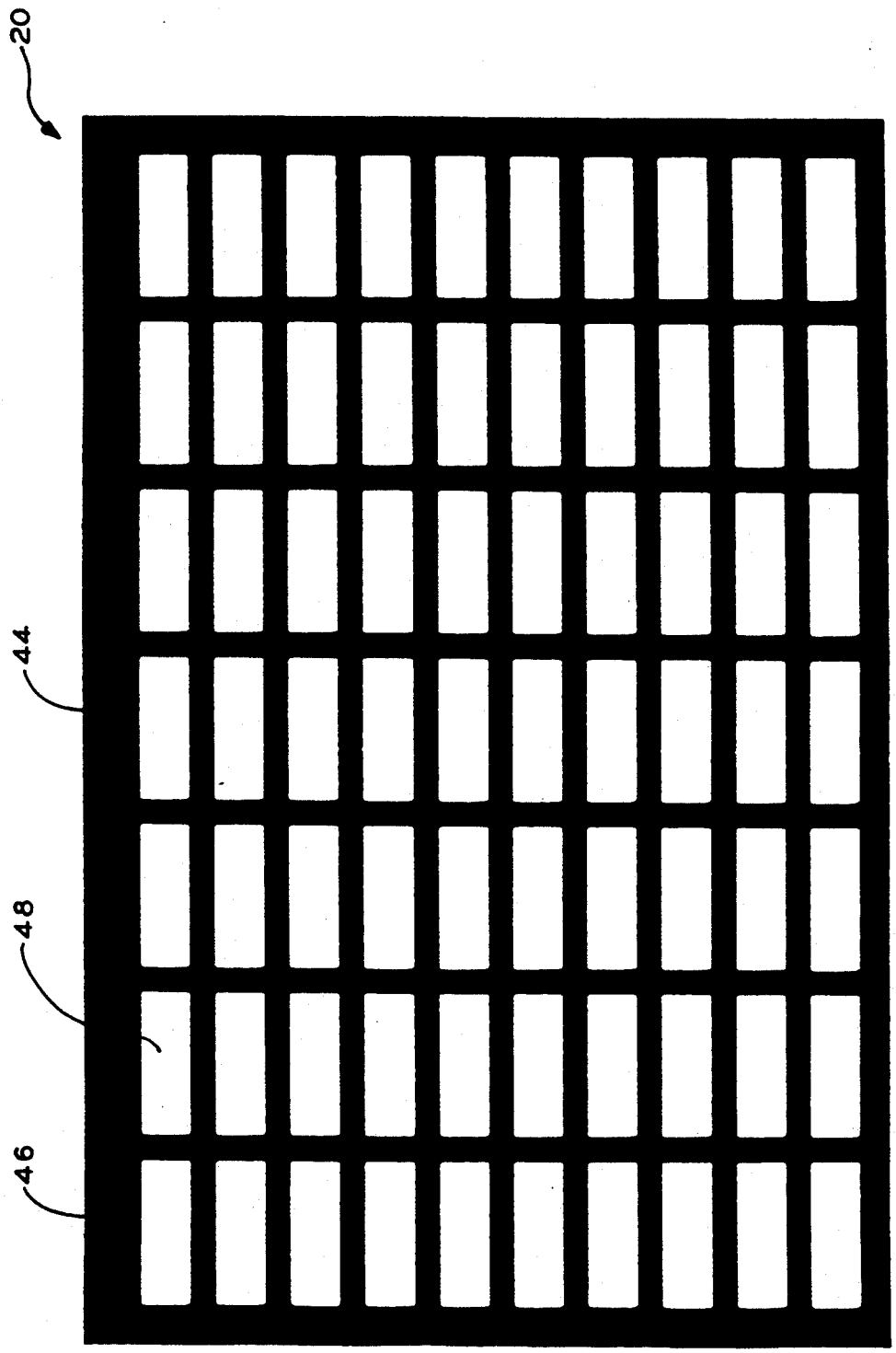
FIG. 9 is a section view of a mask overlay sheet as taken along the line 9—9 of FIG. 1.

As shown in FIG. 9, mask overlay sheet 20 has a clear plastic sheet 44 and has a printed mask portion 46 which surrounds a plurality of spaced clear openings 48. Openings 48 have the same vertical and horizontal spacings as panels 24. Panel 24 slightly overlaps a corresponding opening 48 in order to prevent light seepage there through.

In use, support board 11 may be placed on top of a table, or the like, for ease of viewing different color combinations of the lettering colors and the panel colors. Fill sheet 14 is slid back and forth and up and down, relative to background sheet 12. Seventy different colors of fill letters 34 is compared to each panel of the seventy panels 24. The chosen color combination is used to design and make a color combination. In an alternate procedure, outline sheet 16 is slid back and forth, and up and down, relative to background sheet 12, and a color combination as chosen. Then, inset sheet 18 is slid back and forth, and up and down, to compare each inset lettering 42 to the chosen outline lettering 38 and background lettering 28. In this way demonstrator 10 allows a customer to see at one time a variation of many different color combinations. The designer, customer can easily select the background color for the graphic itself and an optional outline color for the letters and the inset color of the letters. Also, the transparent sheets 12, 14, 16, 18, when superimposed, do not permit light seepage, thereby avoiding detracting coloration. Further, mask overlay sheet 20 can be used to aid viewing of translucent colors by blocking escaping light around panels 24. Color codes can also be printed in white on mask overlay sheet for providing a numbering system.

Advantages of demonstrator 10 are indicated hereafter.

A) Many different color combinations of demonstrator 10 can be displayed to a customer for designing a color combination.

B) A customer can see the three color combinations of a design by sliding the background sheet 12, fill sheet 14, or outline sheet 16 and inset sheet 18, to a desired relative position.

C) Translucent color combinations can be shown by demonstrator 10 for use with backlighting.

D) Light leaks are avoided in the demonstrator 10 by using overlapping edges on the background sheet 12, fill sheet 14, outline sheet 11, and inset sheet 18.

E) A numbering system or color coding is provided in demonstrator 10, as each color has a specific number, for ease of coordination of production and sales.

F) Demonstrator 10 can relatively quickly demonstrate colors and color combinations for a proposed design, by customer viewing of the demonstrator during operation thereof.

While the invention has been described in its preferred embodiment, it is to be understood that the words which have been used are words of description rather than limitation and that changes may be made within the purview of the appended claims without departing from the true scope and spirit of the invention in its broader aspects.

For example, support board 11 is made of clear plastic material, for use in choosing colors for an internally lighted sign, where light passes through board 11.

I claim:

1. A design color demonstrator comprising:
   a plastic support board;
   a transparent plastic background sheet supported by the plastic board and having a plurality of spaced identical but differently colored panels each with identical transparent letterings;
   a transparent plastic lettering sheet unit supported on the background sheet and having a plurality of spaced identical but differently colored letterings, corresponding to the identical transparent letterings of said colored panels, printed thereon for superimposing one at a time on each panel transparent lettering, and
   a mask overlay sheet supported on the lettering sheet unit and having a printed mask portion with a plurality of spaced identically shaped clear openings for superimposing a selective opening on a chosen panel and a chosen superimposed lettering and for recording respective code numbers of the panel color and the lettering color and the lettering outline color, said mask overlay sheet and background sheet and lettering sheet unit being slidable relative to each other and relative to the support board.

2. The demonstrator of claim 1, wherein the transparent lettering sheet unit is a fill sheet.

3. The demonstrator of claim 1, wherein the transparent lettering sheet unit includes an outline sheet and an inset sheet.

4. The demonstrator of claim 1, including a support board on which the background sheet rests.

5. The demonstrator of claim 1, wherein the support board is an opaque sheet.

6. The demonstrator of claim 1, wherein the support board is a clear sheet, for choosing colors of an internally lighted sign.

7. The demonstrator of claim 1, wherein the support board is about one-quarter inch in thickness, and the background sheet and lettering sheet unit each has a sheet of about a five millimeter thickness.

8. The demonstrator of claim 1, including a mask overlay sheet which rests on the lettering sheet;
   said mask overlay sheet includes a clear plastic sheet and a printed mask portion disposed on the clear plastic sheet;
   said printed mask portion having a plurality of spaced identically shaped clear openings, each said opening being overlapped along its edges by each of the panels of the background sheet when superimposed thereon.

* * * * *